Patented Apr. 26, 1949

2,468,534

UNITED STATES PATENT OFFICE

2,468,534

TOUGH, FLEXIBLE, POLYAMIDE RESIN-HYDROCARBON RESIN COMPOSITIONS

David W. Young, Roselle, and William J. Sparks, Cranford, N. J., assignors to Standard Oil Development Company, a corporation of Delaware No Drawing. Application November 23, 1944, Serial No. 564,900

5 Claims. (Cl. 260—23)

This invention relates to novel plastic compositions, and to methods of preparing and using same; and more particularly it relates to a particular combination of a certain particular type of brittle hydrocarbon resin with other brittle, rigid, non-flexible resins to make a plasticized composition.

Many different plastics are known to the art, and although certain ones of them are useful per se for certain purposes, many of the ones which have the best properties in certain respects such as hardness, for instance, cannot be used without having a plasticizer or softener added thereto, but it is difficult, and has in many cases been impossible, to find a plasticizer which is entirely satisfactory for some of the best resins, which includes particularly the high molecular weight synthetic normally brittle, hard, rigid, non-flexible resins containing hydrogen and carbon alone or together with at least one element selected from the group consisting of oxygen and nitrogen. Apparently the high molecular weight and the presence of these latter two elements are strong factors in preventing the compatibility of such resins with certain materials such as high molecular weight polybutene which is one of the best heretofore available plasticizers from the point of view of moisture-resistance, flexibility and good electrical insulation properties. The result is that such brittle resins usually have heretofore been plasticized with relatively low molecular weight materials containing oxygen or nitrogen, such as dibutyl sebacate, tricresyl phosphate, dioctyl phthalate, etc., which generally have the disadvantage that they have a slight vapor pressure even at ordinary atmospheric temperatures and therefore gradually vaporize and permit the resin composition to get harder upon aging and therefore more brittle, these disadvantages being aggravated by storage or exposure to more elevated temperatures.

It has also been suggested heretofore to use certain hydrocarbon materials such as a copolymer of styrene and isobutylene of relatively low styrene content made at low temperatures below 0° such as —20° C. or even —80° C. to plasticize rubber, but such copolymers, having for instance a combined styrene content of 10% or 20%, are not compatible with brittle resins, especially those of high molecular weight containing oxygen or nitrogen. It is known that styrene-isobutylene copolymers of high molecular weight and very high styrene content, i. e. 65 to 95%, e. g. 70% and 90%, made at below —50° C., are also compatible with many of the oxygen- and nitrogen-containing resins, but these hydrocarbon copolymers are per se too rigid and hard to serve as softeners or plasticizers, even though they are highly useful in making compounded hard, brittle resins which have good electrical insulating properties, etc.

It has now been found that, quite surprisingly, these difficulties attending the use of many of the brittle resins can be eliminated largely, if not completely, by compounding therewith a substantial proportion of a low molecular weight brittle styrene-isobutylene copolymer, or such equivalents as will be hereinafter described, which is made with a particularly high proportion of the styrene at moderately low temperature. This particular type of copolymer is found to have satisfactory compatibility with high molecular weight brittle resins and yet for some unknown reason to have good flexibilizing action thereon. In other words, this particular copolymer acts like a plasticizer or solvent for the brittle resins, but it will not vaporize, and consequently this novel plastic composition will not change in plasticity and hardness with age, nor will its excellent electrical insulating properties and resistance to moisture vapor penetration change with age. It also possesses excellent lustre.

The general method of preparing styrene-isobutylene copolymers is described in U. S. Patent 2,274,749, and comprises effecting the copolymerization at a temperature below about 0° C. in the presence of an active halide polymerization catalyst, preferably in the presence of an inert volatile organic liquid serving as a solvent and/or refrigerant, using temperatures for instance of —20° C., —40° C., —80° C., or even lower, and using various proportions of styrene and isobutylene.

However, according to the present invention, it has been found that out of the vast number of different types of copolymers which are possible with various combinations of temperature and styrene content, only a relatively narrow combination of conditions will result in copolymers coming within the field of the present invention, namely, by carrying out the copolymerization at temperatures which are below —10° C. but not below about —45° C., e. g. —23° C., the boiling point of methyl chloride, or —30° C., and by using a styrene content within the narrow range of about 50–80%, preferably 55–70%, and a corresponding isobutylene content of about 50–20%, preferably 45–30%. If copolymerization temperatures substantially lower than —50° C. are used with a styrene content of 70 or 80%, the resulting copolymers are found to be too hard and of too high molecular weight to have desired plasticizing and flexiblizing characteristics. It is thus apparent that the particular combination of proportions and operating conditions employed according to this invention obtain an unexpected plasticizing effect heretofore not thought possible by the use of a brittle addition agent.

The preparation of the hydrocarbon copolymer will now be further discussed. Instead of isobutylene, other aliphatic olefins or alkenes may be used, preferably having more than two carbon atoms and preferably iso-olefins having 4 to 8 carbon atoms such as isopentene (methyl-2-butene-1) or a normal pentene obtained by dehydration of secondary amyl alcohol.

Instead of styrene other cyclic polymerizable hydrocarbons may be used such as alpha methyl styrene, para methyl styrene, alpha methyl para methyl styrene, indene, terpenes, etc.

The copolymerization is effected by mixing the two reactants, with or without a mutual solvent, if necessary, such as propane, butane, methyl chloride, refined naphtha, etc., and then after cooling the reactants to the desired low temperature, adding an active halide catalyst such as boron fluoride, or activated boron fluoride catalyst (e. g., .1% ether added), aluminum chloride, titanium tetrachloride, aluminum alkoxide-aluminum chloride complex ($AlCl_3.Al[OC_2H_5]_3$), $AlBr_3$, $AlBr_3.Al(OC_2H_5)_3$, $(AlBr_3)_4.AlOBr$ and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: $AlCl_3.AlCl_2OH$, $AlBr_3.AlBr_2OH$, $AlBr_2Cl.AlOCl$, $AlBrCl_2.AlOBr$ $TiCl_4.AlCl_2OH$, $TiOCl_2.TiCl_4$, $AlBr_3.Br_2.CS_2$ $AlBr_3.Br_4.CS_2$, $BF_3$-isopropyl alcohol complex, $BF_3$ solution in ethylene, activated $BF_3$ catalyst in ethylene solution, activated $BF_3$ catalyst in methyl chloride solution. Volatile solvents or diluents, e. g. propane, methyl chloride, carbon dioxide (liquid or solid), etc. may also serve as internal or external refrigerants to carry off the liberated heat of polymerization. After completion of the copolymerization, residual catalyst may be hydrolyzed with alcohol, for example, isopropyl alcohol, or water, or both, and removed by washing the product with water and preferably also with dilute aqueous caustic soda.

The resulting solid copolymer is a hard, brittle solid practically colorless or slightly yellowish, having a high lustre, a specific gravity of about 0.85 to 0.95, and a Shore hardness of about 80 to 100. The preferred content of styrene or other cyclic polymerizable hydrocarbon is from about 55 to 70 and the preferred temperature is about −20° C. to −30° C., the copolymerization being preferably effected by a Friedel-Crafts catalyst such as $AlCl_3$ dissolved in a lower alkyl halide such as methyl chloride, and preferably the copolymerization feed mixture being diluted with about 100 to 400% by volume of lower alkyl halide such as methyl chloride.

The proportions in which the cyclic polymerizable hydrocarbon and the alkene have actually combined during copolymerization may be determined by interpolation of a carbon-hydrogen analysis between the limits of representing 100% of each separate reactant, as for instance, in the case of styrene and isobutylene, between the limits:

|  | Carbon | Hydrogen |
| --- | --- | --- |
|  | Per cent | Per cent |
| Pure styrene | 92.3 | 7.7 |
| Pure isobutylene | 85.7 | 14.3 |

Generally the intrinsic viscosity of the resulting copolymer prepared according to this invention should be about 0.1 to 0.45, preferably about 0.2 to 0.4 (dissolved in toluene) and the average molecular weight will generally be within the approximate limits of 1,000 to 10,000, and preferably within the approximate limits of 3,000 to 7,000. These copolymers are thermoplastic and have softening or melting points between the approximate limits of 30° C. and 60° C., preferably about 40° C. to about 50° C.

For convenience and brevity, the above described copolymer of a cyclic polymerizable material and an olefin or alkene, will be referred to as a cycalkene copolymer, or simply a cycalkene. The specific type of copolymer made from styrene and isobutylene will similarly be referred to for brevity as simply stybutene. The invention will be illustrated as applied particularly to stybutene, although it is not to be limited specifically thereto.

The other chief constituent of the compositions made according to this invention, namely the other normally brittle, rigid, non-flexible resin, especially a high molecular weight one, which may not only contain carbon and hydrogen but also either oxygen or nitrogen, should generally be one having a hardness of at least about 70 and preferably at least 90, according to the Shore hardness durometer test. The invention is particularly applicable to such resins having a brittleness of at least −40° C., by the Thiokol Bend test.

Such hard, brittle resins may be manufactured by a wide variety of chemical processes, although it should be kept in mind that many, if not all, these processes can result in products which are flexible or even soft and sticky and of relatively low molecular weight, under certain operating conditions, but the present invention is concerned only with the product resulting from such processes when carried out under operating conditions leading to the formation of high molecular weight, hard, brittle resins. Such high molecular weight products have numerous other advantages over the low or intermediate molecular weight products, including not only hardness but also superior electrical insulating properties, superior resistance to attack by chemical reagents as well as oxidation, moisture, etc. and superior stability against deterioration with age.

The preferred types of hard, brittle resins are those made by polymeric condensation of higher polybasic organic acids, such as the dimers of the higher fatty acids, fatty esters or fatty oils, with a diamine such as ethylene diamine, to make polyamides. Suitable polyamides such as the one called Norelac, may be produced by the general method described in the April, 1944 issue of Oil & Soap, page 101, and particularly suitable polyesters may be produced by the method described in the Journal of the American Chemical Society, January, 1944, page 84.

For these preferred types of brittle resins, the acid reactant is preferably made by polymerization of higher fatty acids such as linoleic acid or other acids present in soybean oil, linseed oil or other drying and semi-drying fatty oils, the polymerization being preferably carried out to selectively produce as high a proportion as possible of dimer fatty acids, although a small proportion of trimer acids may also be present. The corresponding lower alkyl esters of such acids may also be used such as the dimer of methyl esters of soybean fat acids. If desired, the crude fatty acid polymerization product may be purified or fractionated by distillation under reduced pressure to obtain a relatively pure dimer. Although the chemical structure of dilinoleic acid is not known with certainty, the following data indicate its properties:

Unsaturation—two double bonds
Molecular weight—560
Neutral equivalent—280
Conjugation—negligible
Melting point—non-crystalline at −60° C.

At the present time the chemical structure of the acid is thought to be as listed.

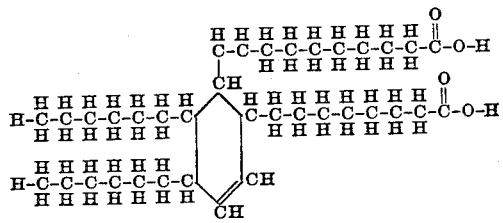

Instead of using this particular type of dibasic acid, other acids which can be used include sebacic, hexadecamethylene dicarboxylic acid, HOOCCH($C_{12}H_{25}$)$CH_2$COOH, etc.

In making the preferred type of polyamide, as referred to above, the diamine to be used may either be one of relatively lower molecular weight such as ethylene diamine, propylene diamine, etc. or may be one of considerably higher molecular weight such as pentamethylene diamine, hexamethylene diamine, etc. The resulting preferred polyamides may be considered to have the general formula:

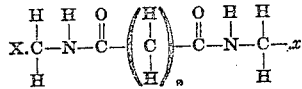

Such polyamides having the desired hardness and other characteristics for the purposes of this invention, should preferably have an average molecular weight of at least 2,000, and preferably at least 10,000, and they are generally insoluble in mineral oils and in many of the low boiling solvents such as toluene, carbon tetrachloride, acetone, etc. although they may be soluble or at least partially soluble in certain low boiling solvents such as chloroform, isopropyl alcohol, etc.

Other high molecular weight polyamides, polyesters, as well as amino resins, etc., may be made by processes such as those described in U. S. Patent 2,071,251.

Other suitable types of high molecular weight brittle resins or plastics containing oxygen alone or together with nitrogen include those made by condensation of a polyhydroxy alcohol with a polybasic acid, e. g. by condensation of glycerol with phthalic anhydride, alone or with a modifying agent such as linoleic acid, resins made by condensation of formaldehyde with urea or with phenols containing little or no alkyl groups, polymerization products of acrylic esters, methyl methacrylate or vinyl esters, e. g. vinyl acetate, or vinyl alcohol, e. g. vinyl butyl alcohol, ethers, e. g. vinyl isobutyl ether, or normally hard, brittle derivatives of cellulosic compounds, e. g. cellulose acetate, cellulose nitrate, ethyl cellulose, etc.

Also, high molecular weight brittle hydrocarbon resins may be used, such as polystyrene, polyindene, polyethylene, hard rubber, cyclicized rubber, etc.

The proportions in which the low molecular weight brittle hydrocarbon copolymer and the brittle high molecular weight resin are to be mixed may vary to some extent according to the nature of the particular materials used, but normally will be within the approximate limits of 1 to 60 wt. %, preferably about 5 to 50% of hydrocarbon copolymer and about 99–40%, preferably 95–50% of the other brittle resin.

In addition to the two primary constituents, the compositions of this invention may also include minor amounts of other additives such as fillers, e. g. clay, carbon black, zinc oxide, etc. or plasticizers, e. g. paraffin wax, petrolatum, zinc stearate, zinc dilinoleate, as well as coloring agents, such as pigments, dyes and the like or antioxidants, etc.

The invention has another distinctly unobvious advantage over prior art of plastic and resinous compositions, in that the particular brittle hydrocarbon copolymer used not only serves per se as a plasticizing agent but also in some instances may serve very suitably as a mutual solvent for the hard, brittle high molecular weight resin, especially one containing oxygen or nitrogen and a lower molecular weight material not normally soluble therein but which could normally be used as a plasticizer for such brittle resin if it were soluble therein or compatible therewith.

In carrying out the present invention the two primary constituents of the composition, namely, the low molecular weight brittle hydrocarbon copolymer and the hard, brittle high molecular weight resin which may contain only carbon and hydrogen or also oxygen or nitrogen, optionally together with minor amounts of other additives, are compounded either by hot milling as on heated steel rolls such as used for milling rubber, or by mixing in a heated kettle equipped with an agitator or in a heated kneading machine such as a Banbury mixer, or by use of volatile solvents with or without heat, using either pressure or refluxing to prevent loss of solvent. Suitable solvents for this purpose include an aromatic petroleum naphtha, toluene, benzene, carbon tetrachloride, chlorinated wax, chlorobenzene, etc. The amount of solvent to be used ranges from 1 to 10 volumes per volume of mixed plastic.

The novel plasticized resins of this invention may be used in many ways as for instance by rolling or sheeting into thin, self-sustaining films which may be used per se as a water-proof, moisture-proof flexible wrapping material, or as a binder for making laminated sheet material such as for laminating two or more sheets of paper, cloth, wood, metal foil, etc. together in various combinations, or such thin films or sheets may be applied thermoplastically as a coating merely on one side of any type of solid base whether it be rigid such as wood, metal, tile, etc. or a flexible material such as paper, cloth, metal foil, etc. In preparing any of the above types of bonded materials, additional adhesives or bonding agents may be used, as for instance, a thin film of polybutene or a stybutene of low styrene content such as 10 to 30%. In applying these novel compositions as a coating on paper or cloth, the plastic may be applied by passing the paper from a continuous feed roller continuously into a hot molten bath of the plastic, or into a solvent solution of such plastic which may or may not be heated sufficiently to give the desired fluidity and coating or impregnating properties, with or without recovery of any solvent which may have been used, or the paper or similar sheet material may merely be contacted with a roll which in turn dips into a bath of the coating material. It is desirable that coated paper for instance be either freed of residual solvent or cooled or both in order to leave a smooth, non-tacky coating surface on the paper before the coated paper is rolled up in the finished roll. The compositions of this invention, particularly because the brittle stybutene has a sharp melting point, may also be used for making injection and compression molded rigid materials, and other products.

The stybutene also substantially improves the weather resistance characteristics of cellulose acetate and other resins in which it is incorporated, but if desired, other addition agents particularly intended for that purpose, such as phenyl salicylate may be added.

The objects and advantages of the invention will be better understood from a consideration of the following specific examples.

*Example 1*

1000 ml. of styrene-isobutylene feed mixture, comprising 600 ml. of styrene and 400 ml. of isobutylene was added to about 3000 ml. of methyl chloride in a large Dewar flask, and to this mixture, maintained at −23° C., the boiling point of methyl chloride, was added 400 ml. of AlCl₃—CH₃Cl catalyst solution comprising 0.9 grams of AlCl₃ per 100 ml. of CH₃Cl. As the catalyst was added with stirring, the solution became very thick. After about 15 minutes 100 ml. of isopropyl alcohol was added to kill the catalyst and stop the polymerization. The polymer in methyl chloride solution was then placed in a 4 liter Pyrex beaker, which was then heated to remove the methyl chloride. The residual dry, colorless brittle solid which is a styrene-isobutylene copolymer of about 60% combined styrene had a heat softening point of 40° C., specific gravity of 0.9, an average molecular weight of about 7,000, and an intrinsic viscosity of about .25 in toluene.

20 grams of this stybutene copolymer was then placed in a 400 ml. Pyrex beaker and 30 grams of high molecular weight ethylene diamine-dilinoleic acid polyamide resin having a Shore hardness above 100 was added. The resin mixture was heated on an electric hot plate to about 200° C. and agitated for 10 minutes at this temperature, after which the mixture was cooled to room temperature and found to be a hard, clear, light-brown resin having a Shore hardness of 95. Some of this resin was drawn into thin films when it was hot, and some of the resin was molded very satisfactorily, whereas either resin per se was too brittle for such purposes.

Also some of this stybutene-polyamide resin was heated to 225° C. and then coated on a glassine paper, using about 10 lbs. of coating per ream, with the result that the coated paper, which had a smooth glossy finish and good flexibility, had a low moisture vapor permeability of only 2.3 grams per square meter per 24 hours, at 64% relative humidity at 77° F.

*Example 2*

Another sample of brittle stybutene of about 60% combined styrene content and made at −23° C. as in Example 1, was compounded by hot milling with a high molecular weight polyethylene which per se was too brittle for use for instance in the form of extruded or molded shaped articles of thin section. The proportions used were 10% by weight of stybutene and 90% by weight of polyethylene. The blended product was found to have a better flexibility than either of the separate constituents. This blended material was satisfactorily extruded into ¼″ rods which had good flexibility, whereas either raw material separately formed products which were too brittle for such use.

*Example 3*

Another sample of brittle stybutene similar to that used in Example 1 was compounded in equal proportions by weight of cyclized rubber known commericially as Pliolite resin powder having the following properties: Distortion point 103° C., glossy, non-tacky, heat sealing and, when present in the form of a film, transparent. These materials were milled together at about 240° F. and found to make a homogeneous compatible blend, which cooled to a hard solid having a softening point of about 80° C.

*Example 4*

10 grams of a cellulose acetate which was quite brittle at all temperatures up to almost 100° C. were dissolved in 30 ml. of acetone. After this 15 grams of stybutene containing 60% styrene by analysis having an intrinsic viscosity of about 0.3, and made in methyl chloride solution at −25° C. by the use of aluminum chloride-methyl chloride catalyst, were placed on a micro rubber mill at 150° F. After the stybutene was a liquid on the mill the cellulose acetate in acetone was added slowly to the stybutene and the warm rolls of the rubber mill mixed the material. It required about 30 minutes to add the cellulose acetate. The temperature of the mill was then increased from 150° F. to 220° F., whereupon all of the acetone used to dissolve the cellulose acetate was removed by vaporization in a few minutes at this high temperature and a uniform resin mixture was obtained on the warm mill. The product was scraped from the mill roll by a knife and found to be a uniform material which was plastic and flexible at temperatures down to 30° C. At lower temperatures, e. g. about 20° C., the resin mixture was slightly brittle but not as brittle as the pure cellulose acetate.

In the appended claims, the expression "intrinsic viscosity" is intended to mean as determined in toluene solution.

It is not intended that this invention be limited to the specific examples which have been given merely for the sake of illustration but only by the appended claims in which it is intended to claim all novelty inherent in the invention as well as all modification coming within the scope and spirit of the invention.

It is claimed:

1. A tough, flexible thermoplastic composition comprising about 40 to 99% by weight of a normally hard, brittle high molecular weight synthetic polyamide resin derived from an aliphatic diamine and a dimer of a higher unsaturated fatty acid, and homogeneously compounded therewith a plasticizing amount of about 60 to 1% by weight of a normally brittle styrene-isobutylene copolymer having a combined styrene content of about 50–80% and having an intrinsic viscosity of 0.1 to 0.45.

2. A hard, flexible thermoplastic composition comprising about 60% by weight of high molecular weight normally hard, brittle ethylene diamine methyl dilinoleate polyamide resin, and homogeneously compounded therewith about 40% by weight of brittle thermoplastic styrene-isobutylene copolymer having a combined styrene content of about 60%, and having an average molecular weight of about 7,000.

3. A tough, flexible, thermoplastic composition comprising a normally hard, brittle, high molecular weight synthetic polyamide of ethylene diamine and methyl dilinoleate, and homogeneously compounded therewith a plasticizing amount of a normally brittle styrene-isobutylene copolymer having a combined styrene content of about 50 to 80% and having an intrinsic viscosity of 0.1 to 0.45.

4. A tough, flexible composition comprising about 40–99% by weight of a normally hard brittle high molecular weight synthetic polyamide resin derived from an aliphatic diamine and a dicarboxylic acid having at least 10 carbon atoms, and homogeneously compounded therewith a plasticizing amount of a hydrocarbon copolymer of a mono-olefinic polymerizable hydrocarbon containing a cyclic nucleus, and an alkene of 3 to 8 carbon atoms, said copolymer having about 50 to 80% content of combined cyclic constituent and having an intrinsic viscosity of 0.1 to 0.45 and an average molecular weight of 1000 to 10,000.

5. Paper impregnated and coated with a smooth, glossy, non-tacky film of a thermoplastic composition as defined in claim 4.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,274,749 | Smyers | Mar. 3, 1942 |